W. V. TURNER.
TRIPLE VALVE DEVICE.
APPLICATION FILED NOV. 7, 1912.
1,107,380.
Patented Aug. 18, 1914.
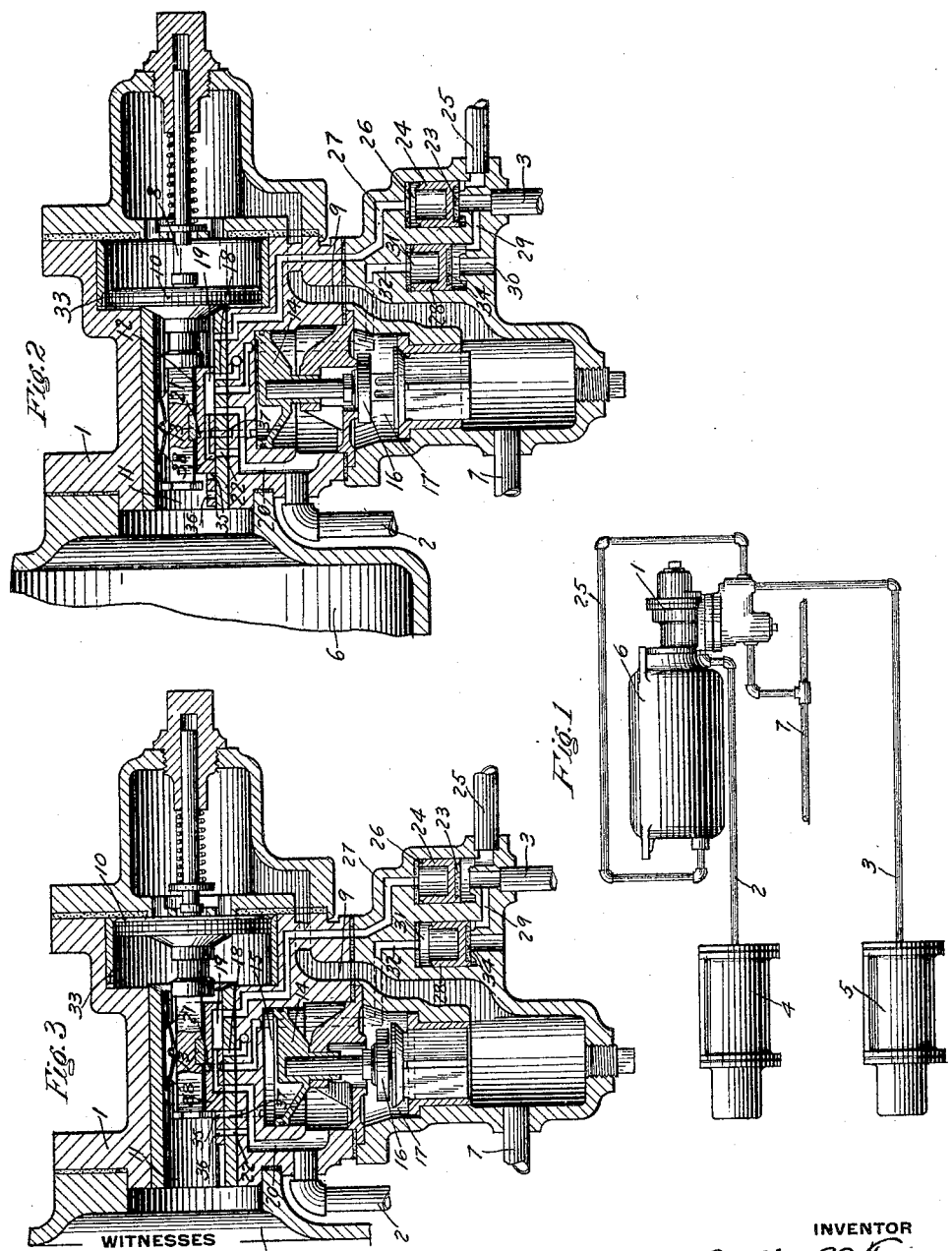
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRIPLE-VALVE DEVICE.

1,107,380.     Specification of Letters Patent.     Patented Aug. 18, 1914.

Application filed November 7, 1912. Serial No. 730,027.

*To all whom it may concern:*

Be it known that I, WALTER V. TURNER, a citizen of the United States, residing at Edgewood, in the county of Allegheny and State of Pennsylvania, have invented new and useful Improvements in Triple-Valve Devices, of which the following is a specification.

This invention relates to fluid pressure brakes, and more particularly to means for securing a high braking power in an emergency application of the brakes.

Various devices have heretofore been proposed for obtaining a higher braking power in an emergency application of the brakes than in a service application of the brakes and the principal object of my invention is to provide improved means for accomplishing the above purpose in which the usual auxiliary reservoir is employed as the source of fluid under pressure from which fluid is supplied to secure an emergency application of the brakes.

In the accompanying drawing, Figure 1 is a diagrammatic view of a car air brake equipment embodying my invention; Fig. 2 a central sectional view of a triple valve device with my improvement applied thereto, and showing the parts in normal release position, and Fig. 3 a similar view, showing the parts in emergency application position.

As shown in Fig. 1 of the drawing, a triple valve device 1 is provided which is connected by the respective pipes 2 and 3 to two brake cylinders 4 and 5. The apparatus also includes the usual auxiliary reservoir 6 and train pipe 7. The triple valve device 1 may comprise a casing having a piston chamber 8 connected by passage 9 to the train pipe 7 and containing piston 10. The casing also has a valve chamber 11 open to the auxiliary reservoir 6 and containing main slide valve 12 and graduating valve 13 mounted on the main slide valve and having a movement relative thereto and said valves are adapted to be operated by piston 10.

In addition to the usual triple valve parts above described, the triple valve device may be provided with an emergency valve mechanism comprising an emergency piston 14 contained in piston chamber 15 and an emergency valve 16 contained in valve chamber 17 and adapted to be operated by piston 14 for venting fluid from the train pipe to the brake cylinder.

The triple valve is provided with the usual exhaust port 18 adapted in release position to be connected by cavity 19 in slide valve 12 with brake cylinder port 20 and the main slide valve 12 is provided with a service port 21 adapted in service application position to register with port 20 leading to the brake cylinder.

According to my invention a brake cylinder 5 is provided in addition to the usual brake cylinder 4 and said brake cylinder is connected by pipe 3 to the seat 23 of a piston valve 24. Said seat is also open to a pipe 25 leading to the auxiliary reservoir 6. The chamber 26 at the opposite side of the piston valve communicates with a passage 27 leading to the seat of slide valve 12. Another piston valve 28 is provided for controlling communication from brake cylinder pipe 3 through a passage 29 to an exhaust port 30 and the chamber 31 at the opposite side of the piston valve communicates with a passage 32 also leading to the seat of the main slide valve 12.

In operation, the triple valve parts being in normal release position, as shown in Fig. 2, fluid from the train pipe is supplied to the auxiliary reservoir through the usual feed groove 33 around the triple valve piston 10 and the usual brake cylinder 4 is connected to the atmosphere through passage 20, cavity 19 in slide valve 12, and exhaust port 18. Passage 32 is also connected to exhaust port 18 through cavity 19, so that chamber 31 is subject to atmospheric pressure and if there is any fluid under pressure in brake cylinder 5, the same will be released through passage 29 and exhaust port 30 by reason of the brake cylinder pressure acting on the seat 34 of the piston valve 28. In the release position, passage 27 is open to valve chamber 11 and the auxiliary reservoir, so that the chamber 26 of piston valve 24 contains fluid at auxiliary reservoir pressure. While the opposite side of the valve piston is also subject to auxiliary reservoir pressure supplied through pipe 25, the passage 29 being open to exhaust port 30, the pressure on that side of the piston valve will be less than the pressure on the opposite side and the piston valve therefore moves to close the communication controlled by seat 23. In the closed position of the piston valve, only a portion of the area thereof is subject to auxiliary reservoir pressure so that the auxiliary reservoir pressure acting on the full area of the opposite side of the piston valve maintains the same in its closed position. Upon a gradual reduction in train pipe pressure, the triple valve parts are moved to service application position and fluid is supplied from the auxiliary reservoir through port 21 and passage 20 to the usual brake cylinder 4, thus effecting a service application of the brakes in the usual manner. Passage 32 is still connected to the exhaust port 18 through cavity 19 and passage 27 is still open to valve chamber 11 so that both piston valves 28 and 24 are maintained in the same positions as described in connection with the triple valve release position.

If it is desired to effect an emergency application of the brakes, a sudden reduction in train pipe pressure is made which causes the triple valve piston to move to emergency position, as shown in Fig. 3 of the drawing. In this position a through port 36 in the main slide valve 12 registers with port 22, so that fluid is supplied from the auxiliary reservoir to the usual brake cylinder 4. A through port 35 also registers with a port 37 leading to emergency piston chamber 15, so that the emergency piston 14 is operated by auxiliary reservoir pressure to open the emergency valve 16 and thus permit the venting of fluid from the train pipe to the brake cylinder. Passage 32 registers in this position with through port 21 in the main slide valve, so that fluid from the auxiliary reservoir is admitted to the piston valve 28. Said piston valve is thereupon shifted to close the seat 34 and cut off communication from the brake cylinder 5 to the exhaust port 30. In emergency position, passage 27 is connected through cavity 19 and port 38 in the main slide valve 12 with brake cylinder port 20, so that the chamber 26 is vented to the brake cylinder and the auxiliary reservoir pressure acting on the opposite side of the piston valve shifts the same to open communication from the auxiliary reservoir pipe 25 to the brake cylinder pipe 3. Fluid under pressure is thus permitted to equalize from the auxiliary reservoir into the additional brake cylinder 5 as well as into the usual brake cylinder 4 and while the equalization of the same reservoir volume into two brake cylinders will not, of course, produce as high a pressure as that produced in a single brake cylinder, the increased brake cylinder area even at the lower equalizing pressure will give the desired additional braking power. After an emergency application of the brakes, the release may be effected in the usual manner by increasing the train pipe pressure, when the triple valve parts are shifted to normal release position, and the piston valve 24 is moved to close the seat 23 while the piston valve 28 is lifted from the seat 34 to release fluid from the brake cylinder 5. In order to obtain a still higher braking power, means such as heretofore employed may be provided for first supplying fluid from the auxiliary reservoir to the usual brake cylinder to cause the brake shoes to engage the wheels and then by means of a suitable clutch device the additional brake cylinder is caused to exert its force to increase the braking power upon supplying fluid from the auxiliary reservoir to said additional brake cylinder.

Having now described my invention, what I claim as new and desire to secure by Letters Patent, is:

1. In a fluid pressure brake, the combination with a train pipe, brake cylinder, auxiliary reservoir, and triple valve device, of an additional brake cylinder and a piston valve normally subject on one side to auxiliary reservoir pressure and on the opposite side to the pressure in the additional brake cylinder and the auxiliary reservoir and operated by venting fluid from one side upon movement of the triple valve device to emergency application position for supplying fluid from the auxiliary reservoir to the additional brake cylinder.

2. In a fluid pressure brake, the combination with a train pipe, brake cylinder, auxiliary reservoir, and triple valve device, of an additional brake cylinder and a piston valve normally subject on one side to atmospheric pressure and on the opposite side to the pressure in said additional brake cylinder for controlling the release of fluid from said additional brake cylinder, said triple valve device having a port communicating directly with said piston valve for supplying fluid to one side of said piston valve upon movement of the triple valve device to emergency application position to maintain the exhaust from the additional brake cylinder closed.

3. In a fluid pressure brake, the combination with a train pipe, brake cylinder, auxiliary reservoir, and triple valve device, of an additional brake cylinder, valve means operating in an emergency application of the brakes for supplying fluid from the auxiliary reservoir to the additional brake cylinder, and valve means for controlling the release of fluid from said additional brake cylinder.

4. In a fluid pressure brake, the combination with a train pipe, brake cylinder, auxiliary reservoir, and triple valve device, of an additional brake cylinder, a piston valve operated by auxiliary reservoir pressure upon an emergency application of the brakes for supplying fluid from the auxiliary reservoir to the additional brake cylinder, and a piston valve operated by the pressure in said additional brake cylinder for controlling the release of fluid therefrom.

5. In a fluid pressure brake, the combination with a train pipe, brake cylinder, auxiliary reservoir, and triple valve device, of an additional brake cylinder, a piston valve operated by auxiliary reservoir pressure upon an emergency application of the brakes for supplying fluid from the auxiliary reservoir to the additional brake cylinder, and a piston valve operated by the pressure in said additional brake cylinder when the triple valve device is in release position for opening an exhaust port to said additional brake cylinder.

In testimony whereof I have hereunto set my hand.

WALTER V. TURNER.

Witnesses:
  A. M. CLEMENTS,
  S. W. KEEFER.

Copies of this patent may be obtained for five cents each, by addressing the "Commissioner of Patents, Washington, D. C."